United States Patent
De Nichilo (10) Patent No.: US 6,733,271 B2
(45) Date of Patent: May 11, 2004

(54) EXTENSIBLE GRIPPER FOR CLAMPING THE HEAD PORTIONS OF PLASTICS MATERIAL PLATES AND THERMOFORMING APPARATUS FOR ON-LINE THERMOFORMING PLASTICS MATERIAL PLATES INCLUDING SAID GRIPPER

(75) Inventor: Giorgio De Nichilo, Milan (IT)

(73) Assignee: Rigo-Gam S.A., Croglio (CH)

(*) Notice: Subject to any disclaimer, the term of this patent is extended or adjusted under 35 U.S.C. 154(b) by 286 days.

(21) Appl. No.: 09/850,532

(22) Filed: May 7, 2001

(65) Prior Publication Data

US 2002/0136793 A1 Sep. 26, 2002

(30) Foreign Application Priority Data

May 8, 2000 (IT) ...................................... MI2000A1005

(51) Int. Cl.[7] .............................................. B29C 51/38
(52) U.S. Cl. .................... 425/388; 425/397; 425/403.1; 425/DIG. 48; 269/32
(58) Field of Search .............................. 425/387.1, 397, 425/400, 403.1, DIG. 48, DIG. 53, 388; 269/32, 27, 25, 45, 139, 43, 739

(56) References Cited

U.S. PATENT DOCUMENTS 3,600,746 A * 8/1971 Kostur et al. ................ 425/383
4,938,678 A * 7/1990 Oulman ....................... 425/397

FOREIGN PATENT DOCUMENTS

GB 2 147 848 * 5/1985

* cited by examiner

Primary Examiner—Robert Davis
Assistant Examiner—Thu Khanh T. Nguyen
(74) Attorney, Agent, or Firm—Hedman & Costigan, P.C.

(57) ABSTRACT

Extensible gripper for clamping plastics material plates on thermoforming apparatus for on-line thermoforming the plastics material plates, in which supporting assemblies support slidably with respect to a central body, sliding blocks which can be driven to project from the side of the central body, thereby providing the gripper with a length which can amount to twice the length of the central body, while providing the required gripping mechanical force on the head portions of the plastics material plates.

4 Claims, 11 Drawing Sheets

EXTENSIBLE GRIPPER FOR CLAMPING THE HEAD PORTIONS OF PLASTICS MATERIAL PLATES AND THERMOFORMING APPARATUS FOR ON-LINE THERMOFORMING PLASTICS MATERIAL PLATES INCLUDING SAID GRIPPER

The present application claims priority to Italian Patent Application Serial No. MI 2000A 001005, filed May 8, 2000.

BACKGROUND OF THE INVENTION

The present invention relates to a novel extensible gripper for clamping the head portions of plastics material plates and thermoforming apparatus for on-line thermoforming plastics material plates including said gripper.

More specifically, the field of the invention is that of the thermoforming apparatus for on-line thermoforming a plate-like plastics material, and which are used for making three-dimensional articles of manufacture in general.

For performing the above processing operations, the plate-like plastics material must be conveyed through a plurality of processing stations, by suitable cooled gripper systems, the gripper of which clamps and holds a plastics material plate at the head portion thereof, or at the sides of the plate which are cross-wise oriented with respect to the plate feeding direction.

In particular, the above mentioned gripping and conveying grippers operate to prevent the hot plate from being deformed before arriving at the molding station, which deformation would generate undesired deflections and/or longitudinal shrinkings.

To fit the length of the gripper to that of the head portion of the plastics material plate to be gripped by the gripper, auxiliary insert elements which are mechanically coupled to the body of the gripper have been conventionally provided.

Moreover, further sliding parts which are laterally driven on a single rail coupled to a supporting central body are provided, said sliding parts projecting from said central supporting body so as to set the desired length of the gripper.

Both the above mentioned prior grippers have the drawback that they cannot be properly cooled or refrigerated, because of their rather complex construction, and that their length can be adjusted exclusively by manual operations. Moreover, in the case of a gripper including sliding parts, the extension of the gripper cannot exceed about 50% of the length of the central supporting body.

In fact, because of the axial single-rail arrangement of the extensible sliding parts, for an extension beyond the indicated value, this prior gripper cannot provide that mechanical support which is necessary for efficiently holding the plastics material plate.

At present, the most simple solution for properly changing the length of the grippers in relationship to that of the head portion of the plastics material plate, is that of fully replacing the gripper with another gripper having the desired size.

This approach provides, with respect to the other mentioned prior grippers, the advantage that the gripper can be cooled through the overall length thereof; however, it has the disadvantage that a number of grippers equal to that of the different-size grippers for gripping the differently sized plastics material plates is required.

To the above it is to be added that, in each case, a manual operation is always necessary for replacing the grippers, which does not allow to automatically adjust their length from the outside of the thermoforming apparatus.

SUMMARY OF THE INVENTION

Accordingly, the main object of the present invention is to provide such a gripper for clamping plastics material plates on thermoforming apparatus, the length of which can be easily changed, even in an automatic manner, up to about twice the basic length of the gripper.

Another object of the invention is to provide a gripper of the above mentioned type which, even in a maximum extended condition thereof, is effective to properly mechanically clamp the head portion of the plastics material plate.

Yet another object of the present invention is to provide such a gripper which includes extensible elements and which can be properly cooled through the overall length thereof.

Yet another object of the present invention is to provide an on-line thermoforming apparatus for thermoforming plastics material plates including the mentioned gripper.

The above mentioned objects, as well as yet other objects, which will become more apparent hereinafter, are achieved by a gripper and a thermoforming apparatus for clamping head portions of plastics material plates, in particular for on-line thermoforming apparatus for thermoforming plastics material plates, wherein said gripper comprises means for allowing said gripper to be extended over 50% of a basic or medium length thereof, while providing a mechanical action necessary for efficiently holding said plastics material plate on said thermoforming apparatus.

Further characteristics of the invention are defined in the dependent claims.

With respect to prior grippers for on-line thermoforming apparatus, the inventive gripper provides the advantage that it can be cooled through the overall length thereof, and that it can be properly adjusted, even in an automatic manner, starting from a control device arranged outside of the thermoforming apparatus.

Moreover, the gripper according to the invention provides the advantage that it can be extended even beyond 50% of its basic length, while providing the mechanical force required for efficiently holding or clamping the plastics material plate.

BRIEF DESCRIPTION OF THE DRAWINGS

The above mentioned and yet other objects, characteristics and advantages of the invention will become more apparent hereinafter from the following disclosure of a preferred embodiment of the gripper and thermoforming apparatus according to the present invention which are illustrated, by way of a non limitative example, in the figures of the accompanying drawings, where.

DESCRIPTION OF THE PREFERRED EMBODIMENT

Figure 1:
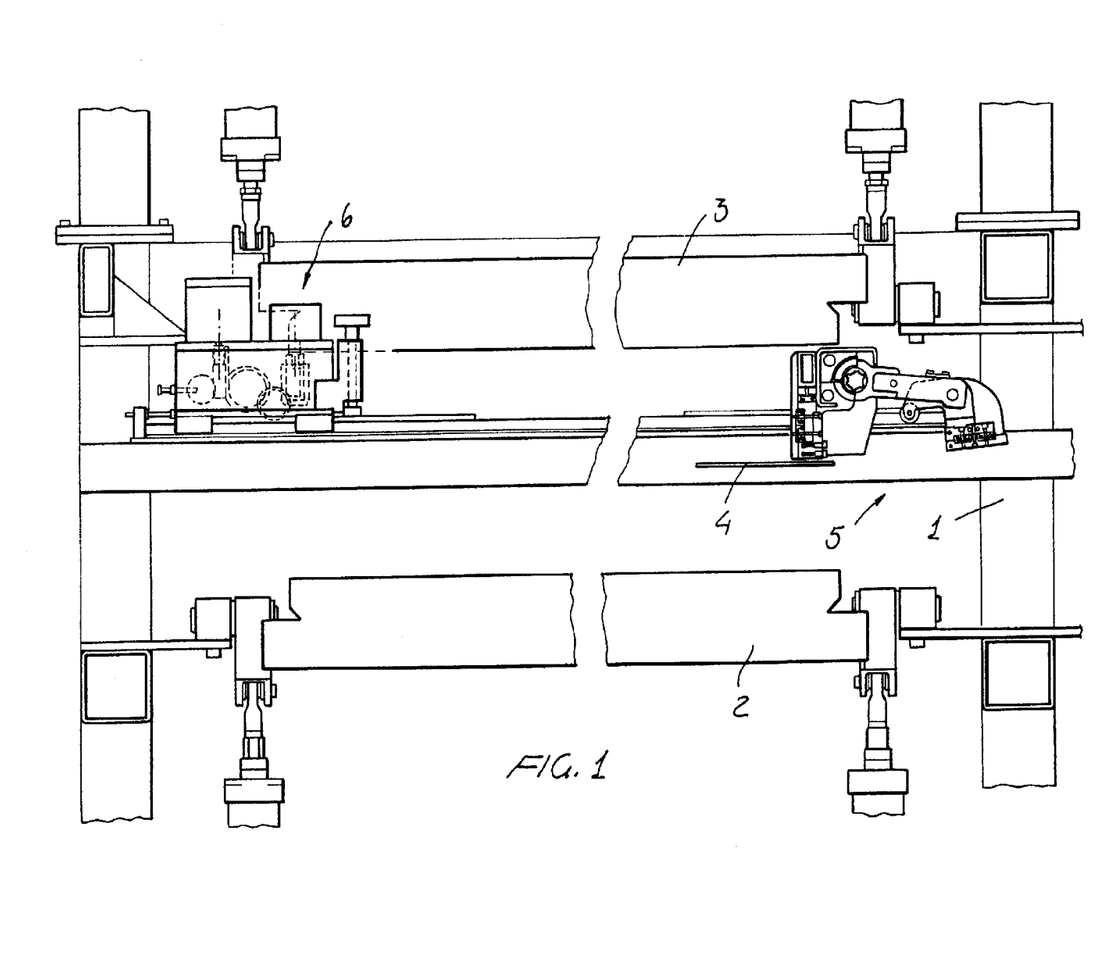
FIG. 1 is a longitudinal cross-sectional detail view illustrating a detail of the heating station of the inventive thermoforming apparatus, in which, for facilitating the disclosure, on the right head of the plastics material plate has been shown the gripper, also according to the invention, whereas at the left portion has been shown only the adjusting assembly for longitudinally adjusting the length of the gripper and for vertically driving said gripper.

The thermoforming apparatus shown in FIG. 1 comprises a supporting construction 1, supporting the heating ovens, respectively the bottom heating oven 2 and top heating oven 3, therebetween is conveyed the plastics material plate 4 to be thermoformed.

The grippers 5 according to the present invention are arranged at the head portions of said plate (in FIG. 1 only the right gripper being shown).

FIG. 1 shows, as mentioned, only the right gripper, whereas, on the opposite side, is shown the driving assembly 6 for properly driving or locating the respective gripper 5.

Figure 2:
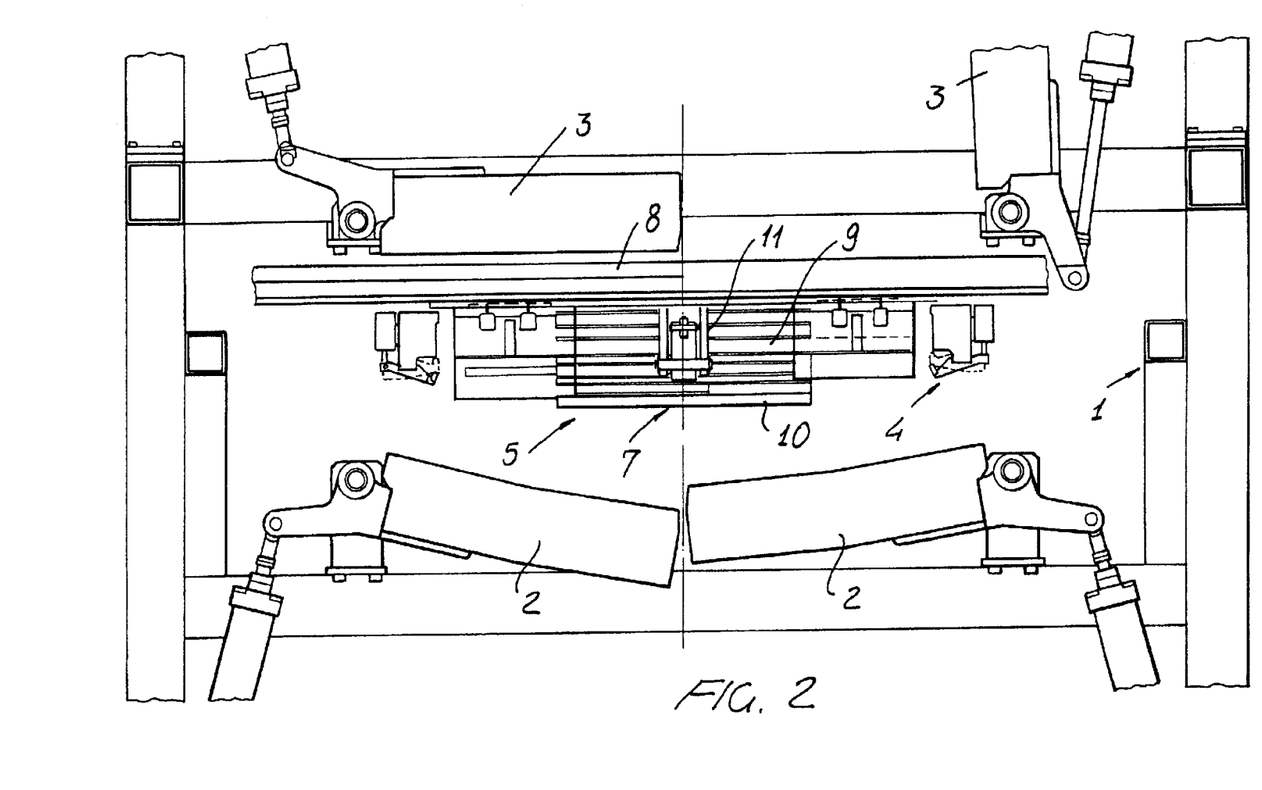
FIG. 2 is a cross sectional view illustrating the thermoforming apparatus of FIG. 1.

The inventive gripper shown in FIG. 2 comprises a central body 7, mounted at an axially centered position on the thermoforming apparatus through a mounting bar 8, which is adjustably fixed on the framework or supporting construction 1 of said apparatus.

The mentioned central body 7 comprises a top bearing plate 9 and a bottom bearing plate 10, which is swingably mounted with respect to the plate 9.

The swinging movement of the bottom plate 10 is achieved by a swinging central support 11, which is axially fixed, and which is better shown in FIGS. 3 to 9.

Figure 6:
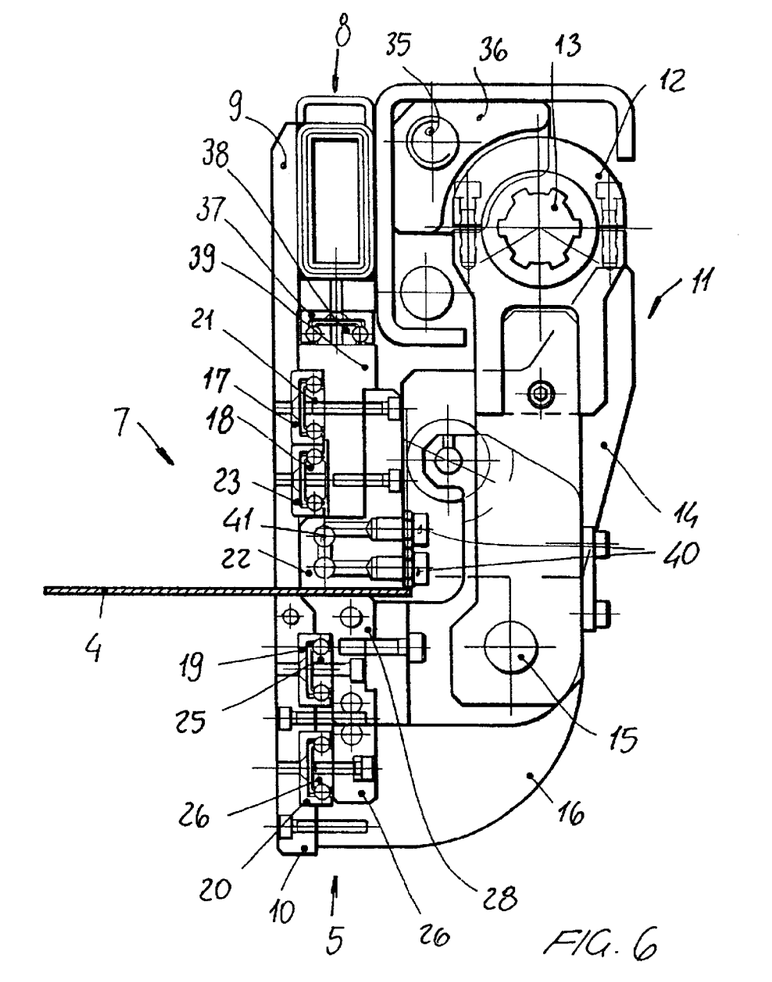
Figure 7:
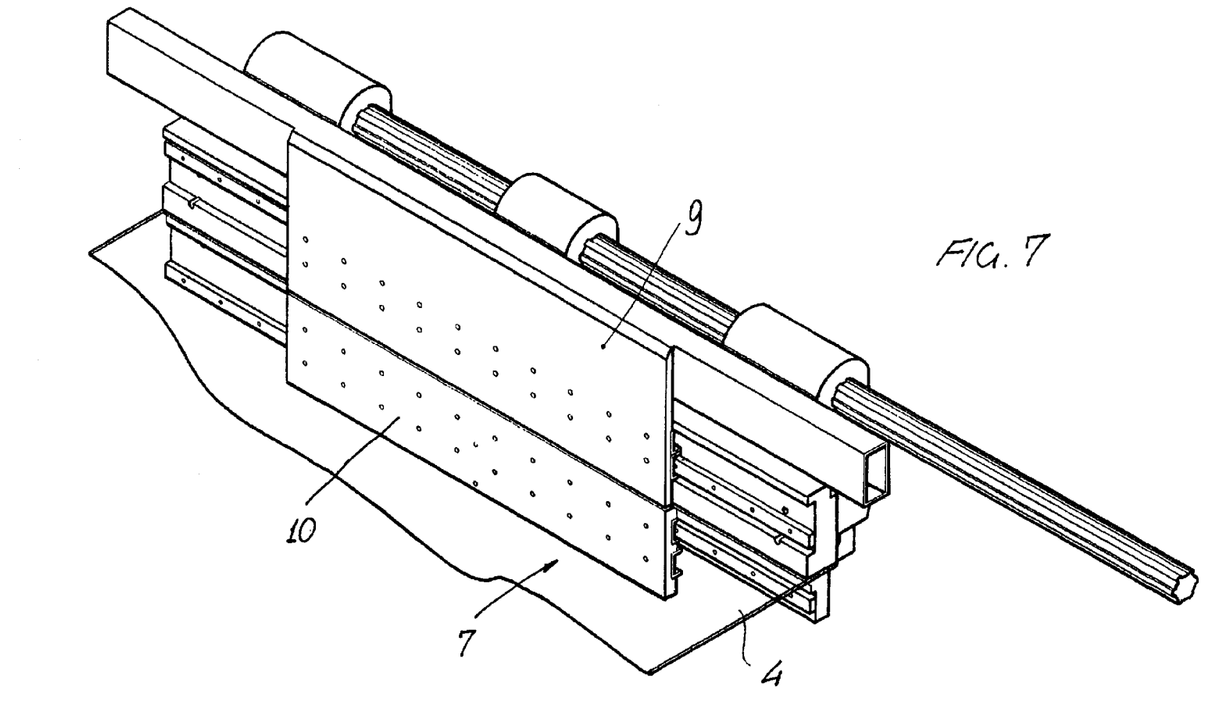
FIG. 7 is a perspective view illustrating the gripper of the preceding figures, as seen from the top inner side thereof, or plate side, in its extended or elongated condition.

The central support 11, shown in these figures, comprises a supporting element 12, axially fixed on the rotary bar 13, which drives the bottom swinging plate 10 (FIG. 6).

The mentioned supporting element 12 is provided with side shoulders 14, on which is pivoted, through a pivot pin 15, the arm 16 supporting the plate 10.

Figure 9:
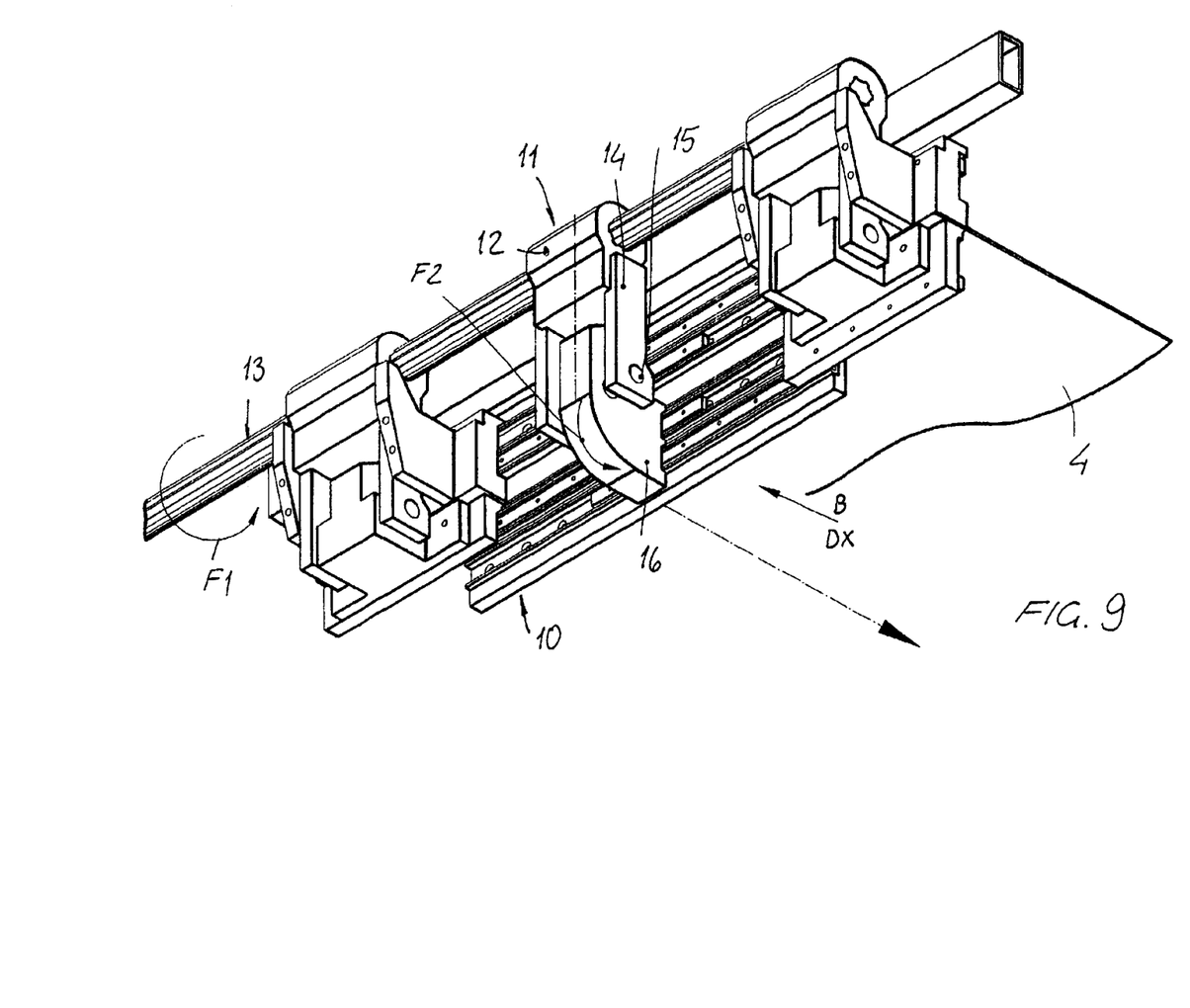
FIG. 9 illustrates the gripper of FIG. 8 as seen from B, or outer bottom right side thereof.
Figure 10:
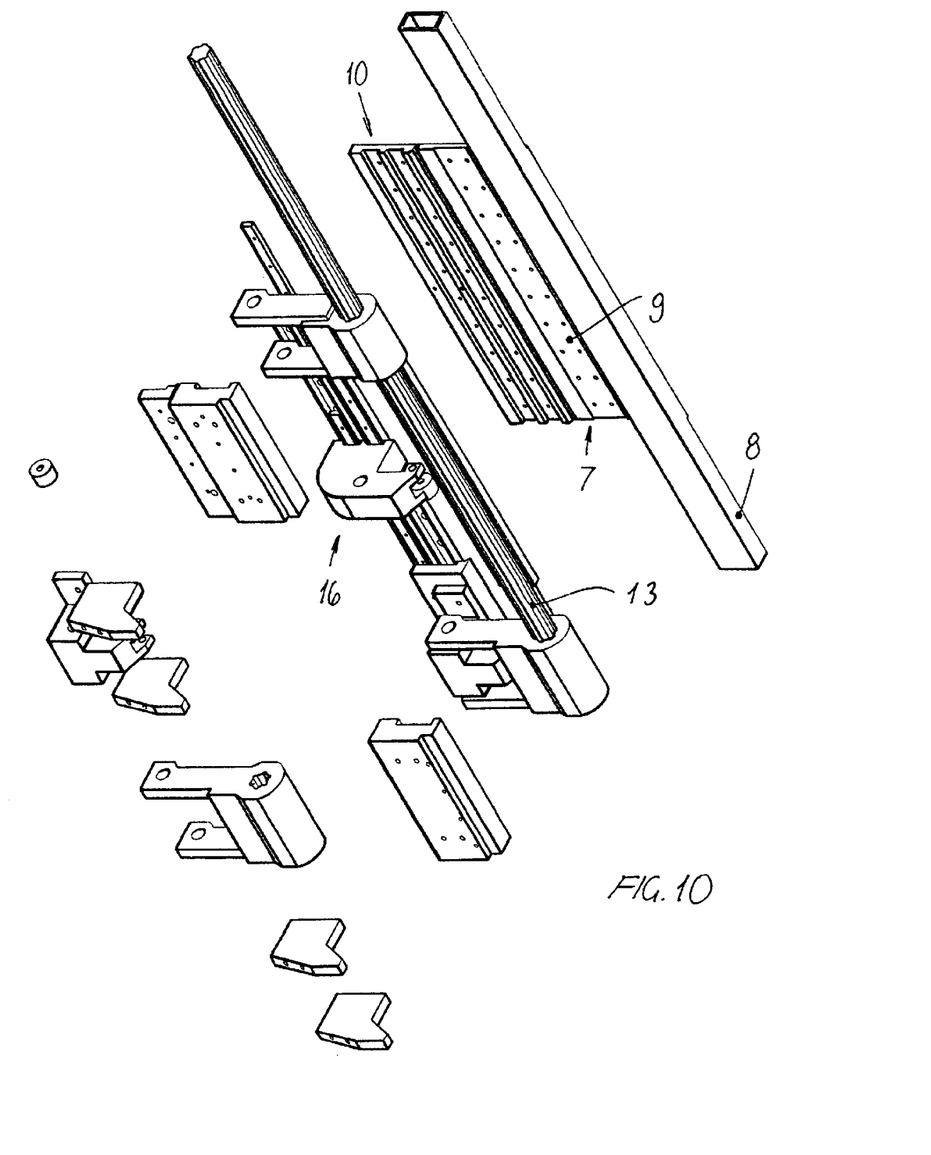
FIG. 10 is an exploded view illustrating the gripper according to the present invention as seen from the top and left side thereof.

More specifically, as clearly shown in FIG. 9, the supporting element 12, including the side shoulders 14, can swing, in the direction of the arrow F1, under the control of the rotary bar 13 (first swinging movement approaching the plate 10 under the plastics material plate 4), whereas the arm 16 can swing in the direction of the arrow F2 (or second swinging movement for gripping or clamping the bottom plate 10 on the plastics material plate 4).

The movement of the gripper 5 with respect to the plastics material plate 4 is better shown in FIGS. 3 to 6.

Figure 3:
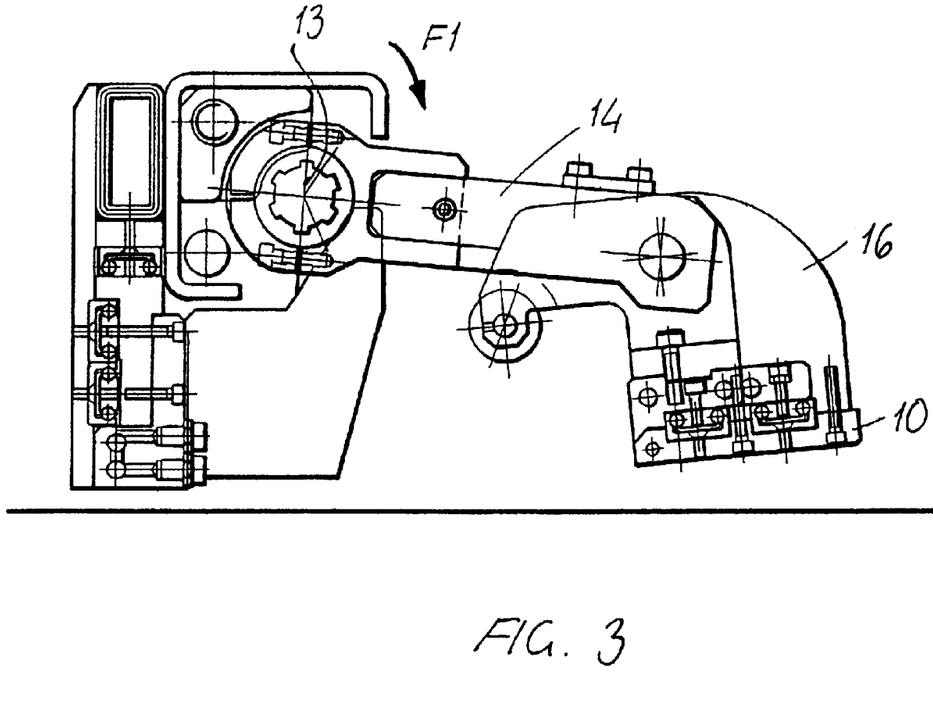
FIGS. 3 to 6 illustrate the gripper according to the invention during its closing or clamping movement on a corresponding head portion of the plastics material plate.

At the start, in its open position, the gripper 5 has the bottom plate 10 supporting arm 16 fully raised from the plastics material plate 4 level (FIG. 3).

Figure 4:
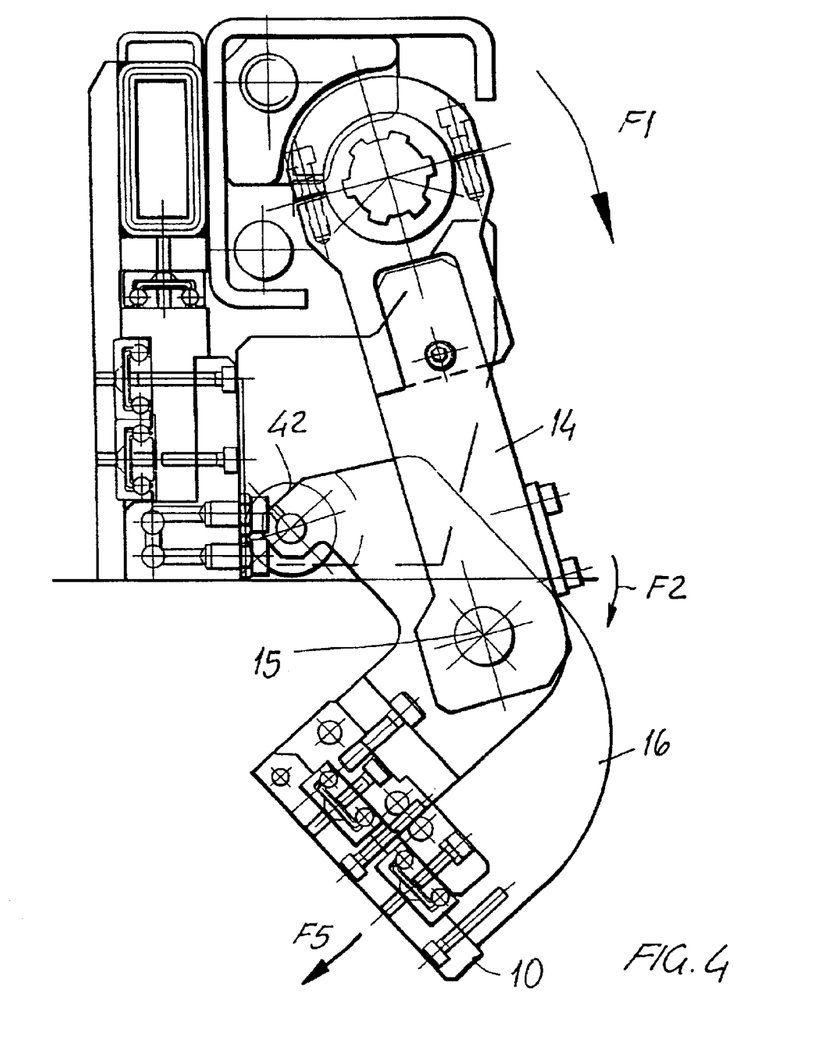
Figure 5:
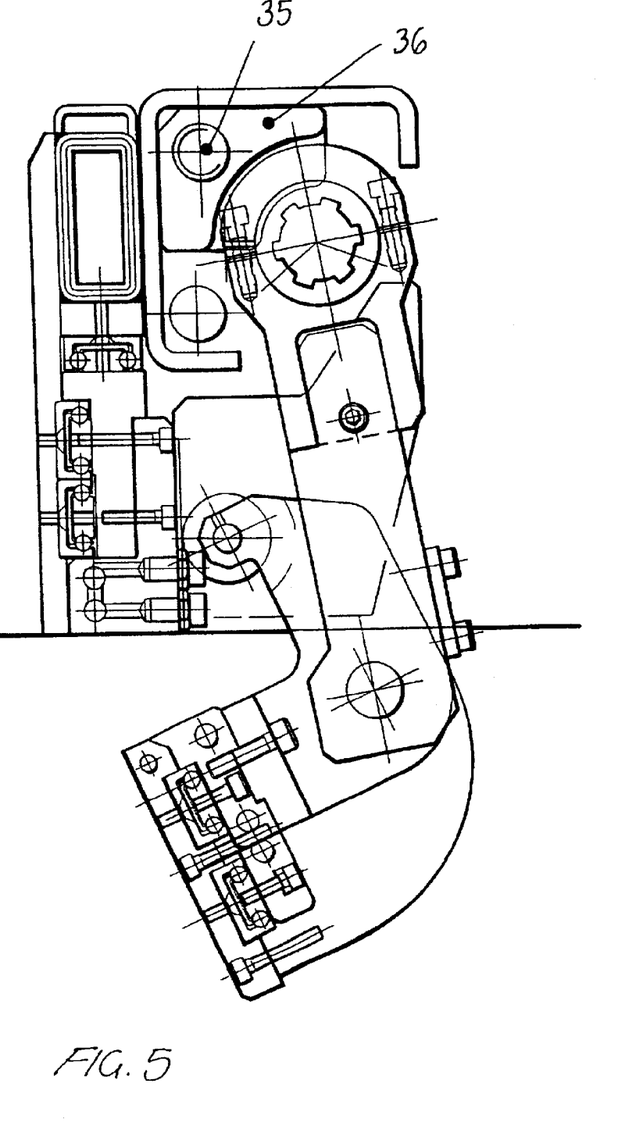

The rotation of the gripper in the direction of the arrow F1 causes at the start a lowering movement of the side shoulder 14 and arm 16, to an interference position of the front projecting lug 42 of said arm 16 against the fixed portion of said gripper 5 (FIG. 4).

Then, a further rotation of the bar 13 in the direction of the arrow F1 causes a corresponding rotary movement of the arm 16 about the pivot pin 15 (arrow F2) and a corresponding swinging movement of the bottom plate 10 in the direction of the arrow F5 of FIG. 4.

With a continued rotary movement, the gripper 5 will close by clamping the head portion of the plastics material plate 4 between the top 9 and bottom 10 plates (FIG. 6).

Figure 11:
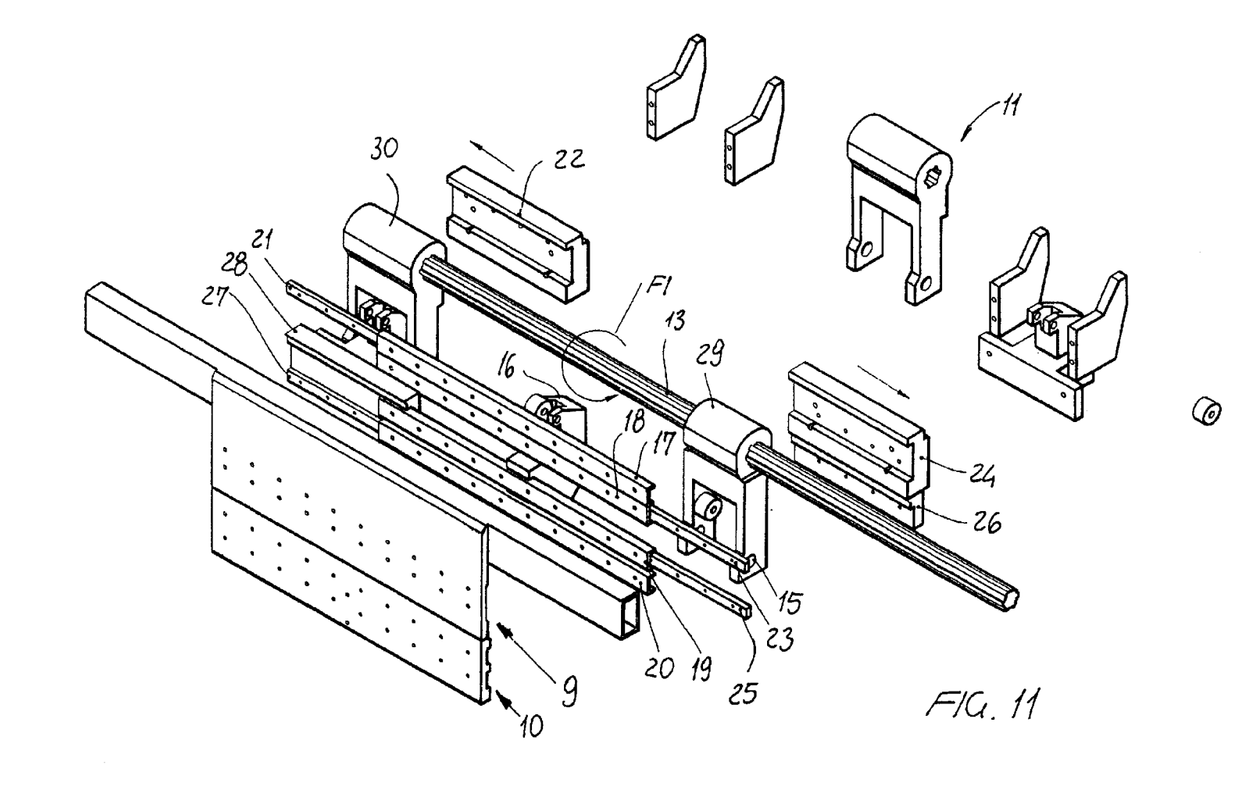
FIG. 11 illustrates the gripper of FIG. 10, as seen from the top and right side thereof.

Said plates 9 and 10 of the gripper 5 comprise respective guides 17, 18 and 19, 20 (FIG. 11) having offset parallel axes, or laying on different planes.

Inside the mentioned guides are respectively mounted the supporting rods:

21, inside the guide 17, for slidingly supporting the sliding block 22 for providing a top side extension (i.e. to the left in FIG. 11) of the gripper 5;

23, inside the guide 18, for slidingly supporting the sliding block 24 for providing a top side extension (to the right in FIG. 11) of the gripper 5;

25, inside the guide 19, for slidingly supporting the sliding block 26 for providing a bottom side extension (to the right in FIG. 11) of the gripper 5;

27, inside the guide 20, for slidingly supporting the sliding block 28 for providing a bottom side extension (to the left in FIG. 11) of the gripper 5;

The sliding blocks 22 and 24 are slidingly supported on the supporting bar 8 also through a guide 37, in turn coupled to a slidingly support element 38 arranged between the bar 8 and the support 39 of said sliding blocks (of which in FIG. 6 only the sliding block 22 has been shown).

The sliding movement of the above mentioned sliding blocks 22, 24, 26, 28 on the outside of the central body 7 is such as to allow the gripper 5 to achieve a length which is nearly twice the minimum or basic length thereof, defined by said central body, owing to the parallel arrangement, on different planes, and not coaxial or not aligned of the guides 17, 18, 19, 20 and, accordingly, of the respective supporting rods 21, 23, 25, 27; this is achieved while providing the mechanical operation necessary for efficiently holding the plastics material plate 4 on the thermoforming apparatus.

Figure 8:
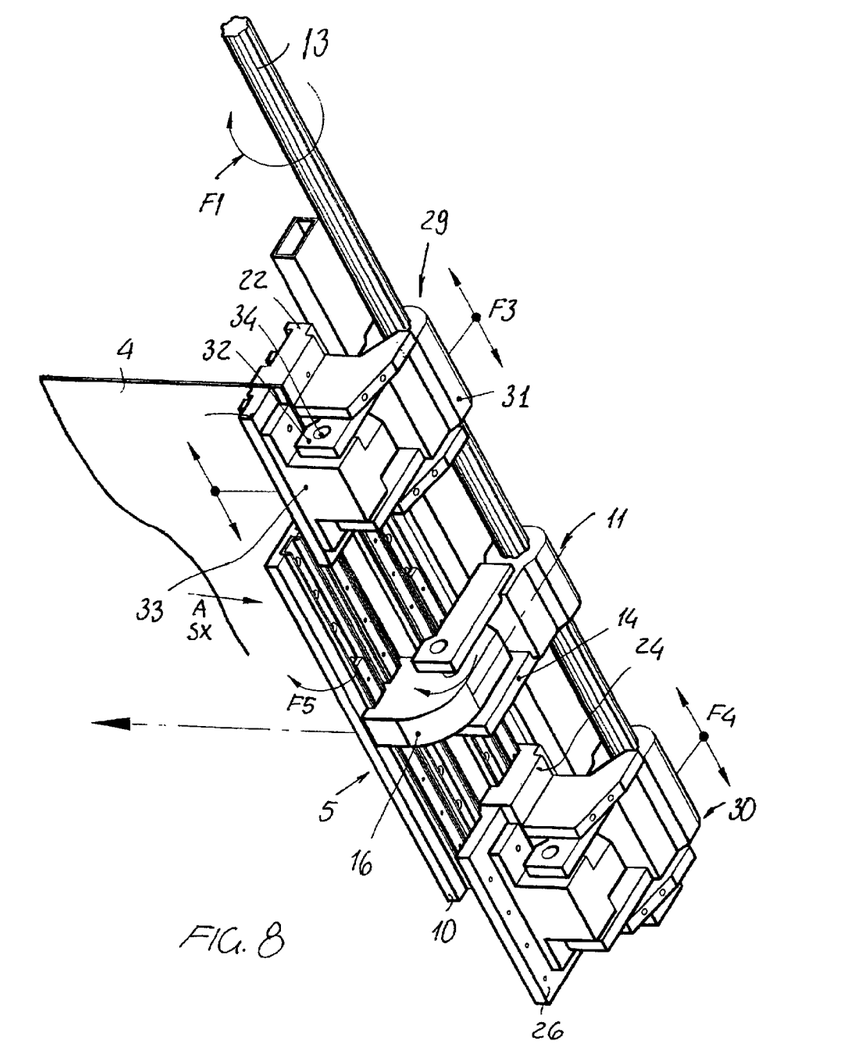
FIG. 8 illustrates the gripper of FIG. 7 as seen from the outer bottom left side thereof (i.e. as seen from A)

The above disclosed movement of said sliding blocks 22, 24, 26, 28 with respect to the central body 7 is allowed, in addition to the above mentioned guides thereof, by the supporting assemblies, respectively the left supporting assembly 29 and right supporting assembly 30 shown in FIG. 8.

Each supporting assembly is slidably mounted on the bar 13, so as to slide in the directions of the arrows F3 and F4, respectively, and the driving movement in the direction of said arrows is provided by a driving assembly (not shown) operating through a threaded rod 35 cooperating with sliding blocks 36.

As clearly shown in FIGS. 8 and 9, the sliding blocks 29 and 30 are respectively provided with side shoulders 32, analogous to those 14 of the above disclosed supporting element 12, thereon are pivoted, at 34, swinging blocks 33 supporting, at a position swinging in the direction of the arrow F5 (corresponding to the arrow F2), the respective bottom sliding blocks 26 and 28 of the gripper 5.

Then, the supporting assembly 29 supports the sliding block 22 and, at its swinging block 33, the sliding block 28 of the gripper 5.

In turn, the supporting assembly 30 supports the sliding block 24 and, at its sliding element or block 33, the sliding block 26 of said gripper 5. Moreover, the bar 13 has a slotted cross-section, to rotatively drive, in the direction of the arrow F5, the support 31 of the block 33 of each supporting assembly 29, 30, to allow a translation displacement (in the direction of the arrows F3 and F4 of FIG. 8), along said bar 13.

Said translation movement will cause the sliding blocks 22, 28 and 24, 26 to project from the respective end portions (left and right in FIG. 8) of the central body 7, thereby allowing the gripper to be extended to the desired length.

This displacement, as stated, is achieved by a suitable driving assembly which can be automatically controlled from the outside of the apparatus.

The grippers 5 are moreover provided, at least at the sliding blocks 22 and 24, with fittings 40 for allowing water to circulate through a circuit 41 for cooling said grippers (FIG. 6).

As a modified embodiment of the inventive gripper, instead of a gripper having a central body 7 including side sliding blocks 22, 24, 26, 28 it would be possible to use a system (not shown) including only two sliding elements or blocks.

Even in such a modified embodiment, two guides would be provided, arranged in a parallel relationship and on different planes, for allowing the gripper to be extended by laterally sliding the mentioned sliding blocks, this time arranged directly slidable on themselves.

The thermoforming apparatus according to the invention, as disclosed and illustrated, can also comprise a single heating oven, instead of two heating ovens, and, in general, said apparatus can be further modified, without departing from the scope of the appended claims.

In particular, in the disclosure and drawings, the supporting rods 21, 23, 25 and 27 are all arranged on a same plane, parallel to that of the central body 7.

However, the advantages of the invention could be also achieved by arranging the supporting rods 21, 23 and respectively 25, 27 on planes cross oriented with respect to that of the central body 7, in which case said supporting rods would be substantially overlapped by pairs.

What is claimed is:

1. An extensible gripper for clamping head portions of plastics material plates, in particular for on-line thermoforming apparatus for thermoforming plastics material plates, wherein said gripper comprises means for allowing said gripper to be extended over 50% of a basic or medium length thereof, while providing a mechanical action necessary for efficiently holding said plastics material plate on said thermoforming apparatus wherein said gripper comprises:

a top side left sliding block for extending said gripper, said top side left sliding block being coupled to a supporting rod slidably mounted inside a guide in turn rigid with a central body;

a top side right sliding block for extending said gripper, said top side right sliding block being coupled to a supporting rod slidably mounted inside a guide in turn rigid with said central body;

a bottom side right sliding block for extending said gripper, said bottom side right sliding block being coupled to a supporting rod slidably mounted inside a guide in turn rigid with said central body;

a bottom side left sliding block for extending said gripper, said bottom left sliding block being coupled to a supporting rod slidably mounted inside a guide in turn rigid with said central body.

2. A gripper according to claim 1, wherein said central body comprises a top plate and a bottom plate, said bottom plate being swingably mounted with respect to said top plate.

3. A gripper according to claim 2, wherein some of said guides are coupled to said top plate, whereas other of said guides are coupled to said bottom plate.

4. An extendable gripper for clamping head portions of plastics material plates, in particular for on-line thermoforming apparatus for thermoforming plastics material plates, wherein said gripper comprises means for allowing said gripper to be extended over 50% of a basic or medium length thereof, while providing a mechanical action necessary for efficiently holding said plastics material plate on said thermoforming apparatus wherein said gripper comprises, at least at said sliding blocks, fitting elements for allowing water to circulate through a circuit for cooling said gripper.

* * * * *